Jan. 8, 1957  H. A. SPARKS  2,776,814
DRUM MOVEMENT INDICATOR
Filed Oct. 9, 1953  2 Sheets-Sheet 1

INVENTOR.
HUBERT A. SPARKS
BY
Hyde, Meyer, Baldwin & Doran
ATTORNEYS

Jan. 8, 1957 H. A. SPARKS 2,776,814
DRUM MOVEMENT INDICATOR
Filed Oct. 9, 1953 2 Sheets-Sheet 2

INVENTOR.
HUBERT A. SPARKS
BY
Hyde, Meyers, Baldwin, & Doran
ATTORNEYS

United States Patent Office 2,776,814
Patented Jan. 8, 1957

2,776,814
DRUM MOVEMENT INDICATOR
Hubert A. Sparks, Cleveland, Ohio

Application October 9, 1953, Serial No. 385,159

2 Claims. (Cl. 254—150)

This invention relates to control apparatus and more particularly to sensing control apparatus for physically sensing the rate of rotation of shafts and drums.

An object of this invention is to provide sensing apparatus which transmits the rate of rotation of a shaft or drum to an operator's hand at his control station.

Another object is to provide apparatus which communicates the rate of rotation of a drum to the operator by the sense of touch.

A still further object is to provide apparatus which will communicate the rate of rotation of a cable drum and the amount of cable paid out to an operator who occupies a position where he can not see the article controlled by the drum and cable, and when he can not or dare not watch the drum.

Another object of the invention is the provision of a rotating hand grip coordinated with the rotational rate of a drum, whereby the operator may grasp the grip in his hand and through his sensory organs perceive the rate at which the drum is revolving.

Another object of the present invention is to provide a drum movement indicator characterized by its structural simplicity, the ease of assembly of its parts, its strong and sturdy nature and its low manufacturing cost. Other features of this invention reside in the arrangement and design of the parts for carrying out their appropriate functions.

Other objects and advantages of this invention will be apparent from the accompanying drawings and description and the essential features will be set forth in the appended claims.

Figure 1:
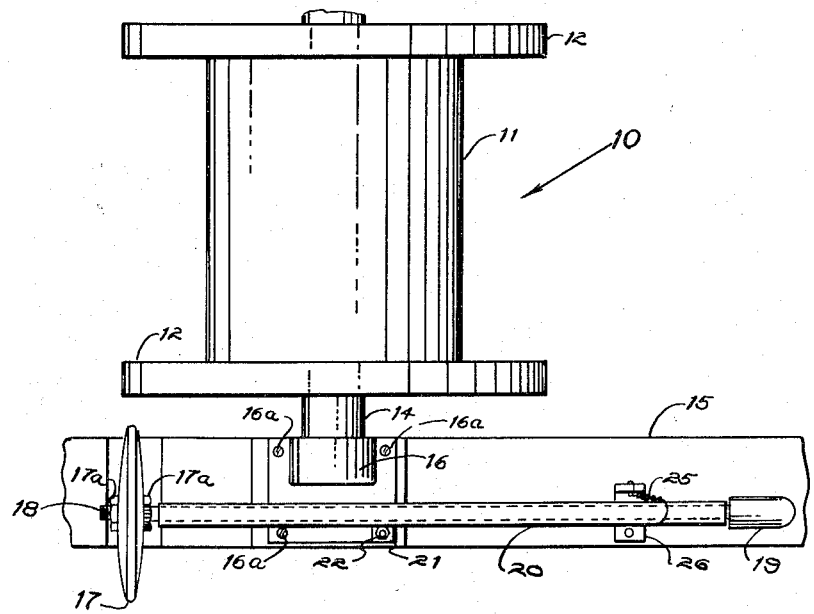
Fig. 1 is a top plan view of my novel sensing control apparatus, positioned adjacent a drum.
Figure 2:
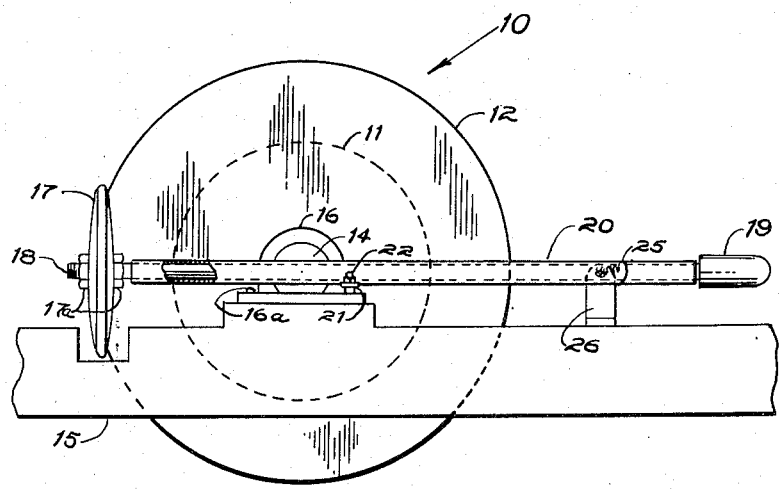
Fig. 2 is a side elevational view of the apparatus shown in Fig. 1.

Referring now to Figs. 1 and 2, a cable drum 10 is rotatably mounted on axle 14 which has one of its ends tightly secured to a supporting frame 15 by means of a cap or bracket 16 fastened to frame 15 by bolts 16a. It is obvious that drum 10 may be a single drum or it may be one of a pair of drums arranged in tandem. The drum comprises a cylindrical center portion 11 suited for holding cable, wire, rope or the like. An annular end rim 12 confines and maintains the cable on the main portion of the drum 10. Mounted on the supporting frame 15 in a pivotal position adjacent the drum is a contact element or wheel 17. The wheel 17 is securely fastened to the end of rod 18 by two lock bolts 17a. The rod 18 is journaled for rotation in a hollow tubular housing 20. The end of rod 18 opposite wheel 17 has a gripping handle 19, secured to and rotatable with rod 18. The handle projects beyond the shaft 20 and has an outside diameter somewhat larger than the diameter of the tubular bore in housing 20; thereby preventing the rod 18 from being accidentally withdrawn from the bore of housing 20.

Housing 20 is pivotally mounted with respect to drum 10 by means of a lever arm 21 pivotally secured by bolt 22 to the base of bracket 16. The wheel 17 is maintained in a rest of non-contacting position with respect to drum 10, when not in use. The rest position is maintained by a tension spring 25 fastened to the housing 20 near the handle 19 and to bracket 26, which in turn is fastened to frame 15, and normally urges the wheel 17 away from the drum 10. It should be noted that wheel 17 is mounted to normally contact the outer edge of the peripheral surface of rim 12, when in operative position. This type of construction facilitates the operation of the sensing device, especially when the drum is revolving at a relatively low speed. It can readily be seen that in this position the small diameter of wheel 17 will have a higher rate of rotation than the drum 10. When the operator wishes to know how fast the drum is rotating, he merely grasps the handle 19 in his hand and pulls it in a drum engaging direction until the wheel 17 contacts the rim 12 of drum 10. The revolving flange then transmits its motion to the wheel 17, which in turn communicates its movement to the handle 19 through rod 18 which is freely rotatable in shaft 20. The operator holding the handle can through his sensory faculties determine the rate at which the drum is rotating, even though the drum be removed from his view. Knowing the rate at which the cable is being payed out, and the diameter of the drum, the operator soon learns to judge whether he is lowering or raising a load on the end of his cable (which he can not see) by 1 foot, 3 feet, 10 feet, etc.

Figure 3:
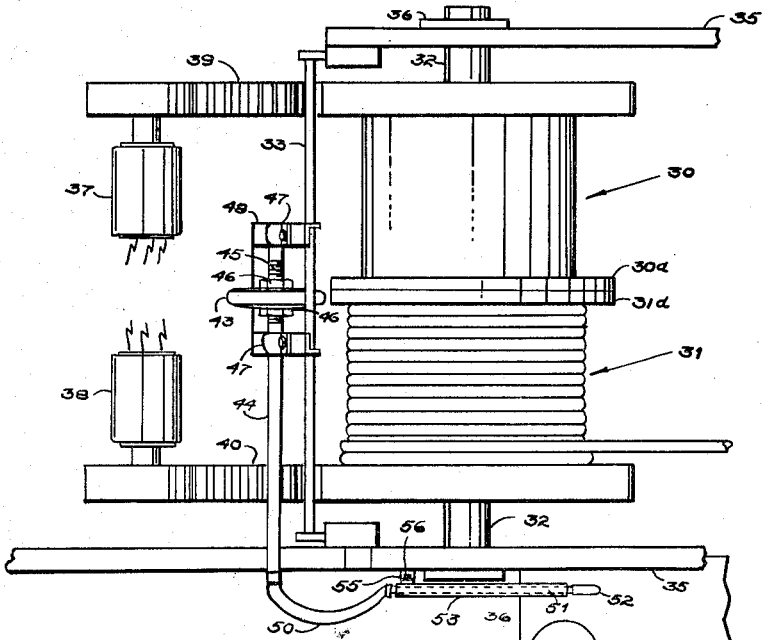
Fig. 3 is a top plan view of a modified embodiment of my sensing apparatus shown adapted for use with dual drums, and, Fig. 4 is a side elevational view of the embodiment illustrated in Fig. 3.
Figure 4:
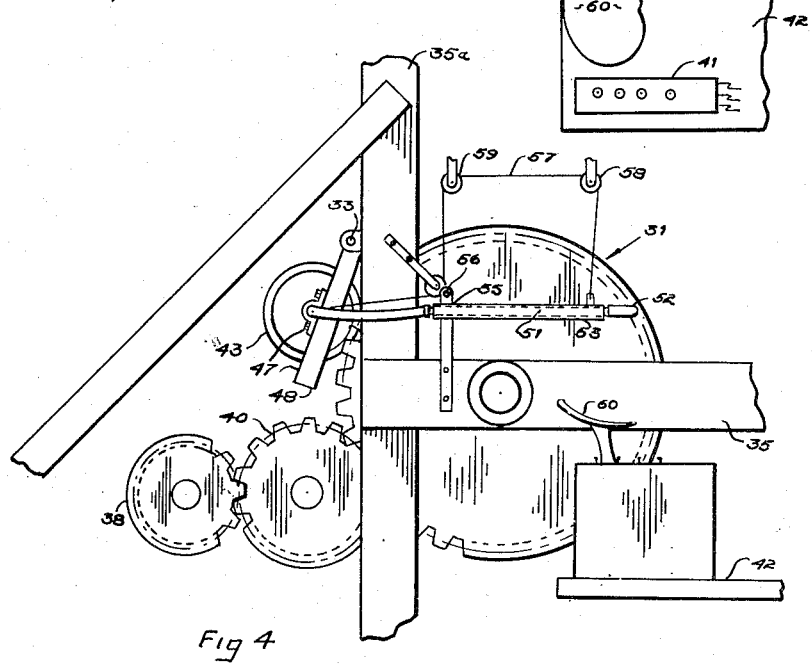

In Figs. 3 and 4, a modified form of the present invention is shown. Here a pair of cable drums 30 and 31 are independently mounted side by side in axial alignment for rotation on shaft 32. The shaft 32 is journaled at both ends for rotation in the supporting frame 35 and is secured thereto by means of retainer plates or bearings.

Each drum has its own driving mechanism, comprising motors 37 and 38, each of which rotates its respective drum through intermediate driving gears 39 and 40. The motors are operated from the control panel 41 positioned adjacent an operator's station 42.

A bar 33 is supported from the vertical frame members 35a positioned at opposite ends of the drums. The bar 33 is adjacent and extends substantially parallel to the drums 30 and 31. A contact element or wheel 43 is fixed to rotate with a shaft 44. The wheel 43 is adjustable along the end of shaft 44 by means of threads 45. Lock nuts 46 on each side of the wheel 43 hold it in an adjusted position. The shaft 44 is rotatably carried in bearings 47 which are bolted to bracket 48. Bracket 48 is pivotally mounted on rod 33 by means of a hinge or any other suitable means. Wheel 43 can be adjusted for engagement with either rim 30a or 31a of drums 30 or 31 respectively. Obviously, wheel 43 might engage any other drum flange, such as the usual braking flange. Means is provided to communicate the rotation of wheel 43 to handle 52. I may use bevel gears drivingly connecting shafts 44 and 51, but I have here shown a flexible shaft 50 transmitting rotation from shaft 44 to connected shaft 51 and handle 52, rotatable with shaft 51. The shaft 51 is rotatably mounted in a tubular housing 53 which is pivotally mounted on the frame 35 by means of bracket 55 and bolt 56.

A cable 57 is connected from a point on shaft 51, adjacent handle 52, over a pair of pulleys 58 and 59 to the bracket 48 in such a manner that pressing down on the handle 52 will cause the wheel 43 to move into contact with the rim of the selected drum.

The operator occupying seat 60 at operator's station 42 can through control panel 41 cause the motors to drive either or both of the drums. At the same time he can manually feel the rotation of the drum by pressing the handle 52 downwardly, causing wheel 43 and handle 52 to revolve. The device is useful at any time during the hoisting operation to let the operator know how much cable he is taking in or paying out. It is particularly useful when the operator wants to move an article a very short distance and the drum is hidden from his sight so that he cannot see it. With a little experience the operator can tell almost exactly how fast the drum is revolving and consequently how much cable has been payed out through the feel of the revolving handle and a mental calculation or sense as to how much cable is wound on or off the drum in a time period at that rate.

In view of the foregoing description, taken in conjunction with the accompanying drawings, it is believed that a clear understanding of the construction, operation and advantages of the device will be quite apparent to those skilled in this art.

It is to be understood, however, that even though there is herein shown and described a preferred embodiment of the invention, the same as susceptible to certain changes, fully comprehended by the spirit of the invention.

What I claim is:

1. Sensing apparatus for a pair of juxtapositioned cable drums, said drums mounted on frame means for independent rotation, said apparatus comprising a pivoted bracket, said bracket rotatably supporting a wheel, said wheel having a normal rest position out of contact with said drum, adjustable means on said bracket permitting axial movement of said wheel for selective engagement with either of said drums, said bracket permitting movement of said wheel into engagement with said selected drum for rotation therewith, a hand grip having an operative connection with said wheel for causing said grip to revolve in coordination with said wheel and drum rotation and means for moving said bracket to position said wheel in driven engagement with said drum.

2. Sensing apparatus for sensing the rotation of a cable drum, comprising in combination a pivoted bracket, said bracket rotatably supporting a wheel, said wheel having a normal rest position out of contact with said drum, said bracket permitting movement of said wheel into engagement with said drum to be rotated thereby, a hand grip having an operative connection with said wheel for causing said grip to rotate in coordination with said wheel and drum rotation, an operative connection between said hand grip and said bracket for moving the bracket to position said wheel in driven engagement with said drum, whereby the operator upon grasping said hand grip may cause said wheel to enter into driven engagement with said drum and simultaneously sense the rate of rotation of said drum.

References Cited in the file of this patent
UNITED STATES PATENTS

| | | |
|---|---|---|
| 759,513 | Frahm | May 10, 1904 |
| 1,993,150 | Drake | Mar. 5, 1935 |
| 2,025,131 | Segerstrom | Dec. 24, 1935 |
| 2,145,929 | Herman | Feb. 7, 1939 |
| 2,553,480 | Seifert | May 15, 1951 |
| 2,717,993 | Newsom | Sept. 13, 1955 |